United States Patent [19]

Myerson et al.

[11] Patent Number: 5,431,713
[45] Date of Patent: Jul. 11, 1995

[54] METHOD FOR THE RECLAMATION OF METALLIC COMPOUNDS FROM ZINC AND LEAD CONTAINING DUST

[75] Inventors: Allan S. Myerson, Brooklyn, N.Y.; Michael W. Cudahy, Effingham, S.C.

[73] Assignee: Metals Recycling Technologies Crop., Atlanta, Ga.

[21] Appl. No.: 277,233

[22] Filed: Jul. 19, 1994

[51] Int. Cl.⁶ ............................................. C22B 15/00
[52] U.S. Cl. ...................................... 75/743; 75/724; 75/725; 75/739; 75/740
[58] Field of Search ................ 75/743, 740, 739, 725, 75/724

[56] References Cited

U.S. PATENT DOCUMENTS

| | | | |
|---|---|---|---|
| 3,464,814 | 9/1969 | Jackson | 75/743 |
| 4,309,215 | 1/1982 | Nissen | 75/724 |
| 4,482,377 | 11/1984 | Heins | 75/743 |
| 5,208,004 | 5/1993 | Myerson | 75/724 |
| 5,228,903 | 7/1993 | O'Keefe | 75/724 |

OTHER PUBLICATIONS

Zinc And Its Alloys And Compounds, by S. W. K. Morgan, at 103 et seq. (Ellis Horwood Ltd., 1985).
Zinc The Science And Technology Of The Metal, Its Alloys And Compounds, at 183 et seq. (Reinhold Pub. Corp., 1959).
Industrial Electrochemistry, by C. L. Martell, at 321-7 (McGraw-Hill Book Co., 1940).

*Primary Examiner*—Peter D. Rosenberg
*Attorney, Agent, or Firm*—Deveau, Colton & Marquis

[57] ABSTRACT

A method for the reclamation of zinc, lead, tin, cadmium and copper from dust containing such elements or compounds which involves leaching the dust with sulfuric acid or ammonium bisulfate, neutralization the leachate with zinc oxide or zinc hydroxide, and cementing and/or roasting various intermediate and final products for the reclamation of the above metals. The method is especially designed for reclaiming the above metals from waste streams from production processes for electrical conductors. The method is a continuous process with the recirculation of various solutions remaining after the completion of each step.

36 Claims, 3 Drawing Sheets

FIG. 1A

MATCH LINE TO FIG. 1B

METHOD FOR THE RECLAMATION OF METALLIC COMPOUNDS FROM ZINC AND LEAD CONTAINING DUST

BACKGROUND OF THE INVENTION

1. Field of the Invention

The present invention relates generally to a method for the reclamation of metal compounds from waste product streams, such as zinc, lead and tin compounds from dust that contains zinc, lead and tin or compounds thereof, and specifically to a metals reclamation method utilizing leaching, cementation and crystallization and/or roasting steps for the reclamation of zinc, lead, tin, cadmium, copper and other metals from metal dust containing these metals and various oxides thereof, such as a metals treatment process waste stream.

2. Prior Art

Metallic dust from the refining or processing of scrap copper contains a high amount of zinc, usually as zinc oxide, and lead, usually as a sulfate or chloride, which are of interest to reclaim. Other compounds present in these dusts include copper, tin and cadmium oxides which also are of interest to reclaim. The dust from these refining or processing operations is a dry, light gray material which also contains a small amount of mica-like chips as well as some magnetic grain, primarily iron oxides. Methods for reclaiming each of these metals are known in the art. However, a combination method for reclaiming two or more of these metals from a metallic dust is not disclosed in the art.

Zinc And Its Alloys And Compounds, by S. W. K. Morgan (Ellis Horwood Ltd., 1985) at 103 et seq. discusses electrolytic processes for removing zinc from zinc sulfide concentrates. Roasting, leaching and neutralization are used in the preelectrolysis of a zinc blend (pages 108-112). However, further treatment of the zinc blend, or flue dust, to reclaim metal compounds is not discussed.

In order for the electrolytic process to be commercially useful, it is necessary to have a solution containing a single metallic element in the compound. For example, the electrolytic process works well in removing zinc from a relatively pure solution of zinc sulfate. In this process, zinc is deposited on the cathodes and periodically removed, while sulfuric acid is formed at the anodes. The presence of iron and/or copper in the solution contaminates the zinc and causes a reduction in current efficiency, and should be removed prior to the electrolytic removal of zinc. Likewise, the presence of cadmium and lead also contaminates the zinc. Consequently, the electrolytic process is not satisfactory for removing a pure metal from a solution containing a number of different metals such as zinc, lead and tin. Electrolysis would be satisfactory for removing zinc from a solution if any lead and tin contained in the solution are removed prior thereto. In the case of zinc dust, it is necessary to precipitate any copper, cobalt and cadmium in the solution prior to the electrolytic removal of zinc. Therefore, it would be desirable to have a process in which the cadmium and copper could be removed by precipitation and the zinc could be removed by a chemical process.

Zinc the Science and Technology of the Metal, Its Alloys And Compounds (Reinhold Publishing Corp., 1959) at 183 et seq., discusses leaching zinc oxide by dissolving zinc oxide in dilute sulfuric acid. While this is a simple process, it results in dissolving unwanted elements in compounds, which affects the electrolysis step. Consequently, leaching with sulfuric acid is not satisfactory alone for removing the various metals in zinc rich dust. The leaching process is designed to lead eventually to the removal of the zinc by the electrolytic process. This monograph shows the use of metallic zinc dust to precipitate any copper in the solution. Cadmium is removed from the solution by agitation with zinc dust or contact with metallic zinc. Consequently, it would be desirable to have a process in which the impurities can be separated from the zinc-rich leachate.

Industrial Electrochemistry, by C. L. Martell (McGraw-Hill Book Company, Inc., 1940) at 321-7, discusses cadmium recovery from zinc electrolyte residues. Cadmium, copper, and zinc are dissolved during the leaching process. The Martell book discusses the use of zinc dust in the precipitation of the cadmium, copper and lead in the residue, the separation of a cadmium precipitate sponge, and the subsequent dissolving of the sponge in dilute sulfuric acid.

There is a need for a method for the efficient reclamation of zinc, lead and tin compounds from dust that contains zinc, lead and tin or compounds thereof. In the processing of electrical cable and other types of electrical conductors a large amount of dust is produced that contains zinc, lead and tin. For environmental and efficiency reasons, a method is needed to reclaim this dust and return it to the initial elements or to a compound containing the element. Further, the reclaimed metals and metallic compounds have value and can be sold, reused, or used in other processes.

Dust from cables and other electrical conductors typically has varying amounts of zinc, lead and tin elements or compounds thereof. This dust frequently also contains a small amount of cadmium and may contain a large amount of copper. It is especially important to recycle the lead and cadmium so as to prevent its introduction into the atmosphere, as both are considered atmospheric pollutants.

It is desirable to minimize the amount of zinc oxide and zinc dust that is needed to conduct the process. This increases the economy of the process by reducing the amount of zinc necessary and the mass of material to be processed. It is also important that the elements reclaimed have a high purity. High purity is necessary for some uses and also results in the process being more efficient.

BRIEF SUMMARY OF THE INVENTION

The present invention satisfies the needs set forth above permitting the recovery of high purity zinc, tin, lead and cadmium elements or compounds thereof from zinc rich dust containing other metals and impurities. Among other products, the present invention permits the recovery of zinc, lead, tin, cadmium, copper, and calcium products.

In the preferred Step 1, Step 1A, the zinc rich dust is first leached by the addition of the dust to a dilute sulfuric acid solution which forms a slurry. The reaction of the zinc oxide in the dust and the sulfuric acid is an exothermic reaction. The reactions of cadmium oxide, copper oxide and lead chloride with the sulfuric acid are slower. Lead sulfate is formed which is insoluble and removed by filtration at this point. Leaching continues until all of the leachable copper and cadmium is dissolved. Zinc oxide or zinc hydroxide then is added to the acid leach filtrate to increase the pH, which results in the formation of insoluble basic sulfate salts of iron, tin, copper and lead, which are removed as a precipitate. Once the amount of impurities in the filtrate solution has been reduced, a first and second cementation of the filtrate using zinc dust results in the removal of many other metallic solids. During the cementation steps, the solution pH is adjusted to become slightly acidic by the addition of acid. A measured amount of zinc dust is added to the solution. The main solids of the first cementation are copper metal, zinc metal and oxide, cadmium and lead. The cementation process can be repeated to remove the remainder of the cadmium present. Once the cadmium solids are removed the main species present is zinc. The zinc can be precipitated from the filtrate solution to form fine zinc sulfate crystals which are filtered from the solution. Recrystallization of the crude zinc sulfate will result in a high purity zinc sulfate product. The solution remaining after crystallization contains dissolved zinc sulfate and can be recycled.

In an alternate Step 1, Step 1B, in lieu of using sulfuric acid as the leachant, ammonium bisulfate can be used to treat the zinc dust. The remaining steps in this process are the same as used in the process described above where sulfuric acid is used to react with and leach the zinc rich dust. The only other difference in the process is that when ammonium bisulfate is used to leach the zinc dust, double salt crystals of zinc sulfate are formed after the first and second cementation steps. These double salt crystals can either be dissolved or decomposed by treatment with ammonia. Step 1 produces a zinc compound product.

In Step 2, the lead cake that is removed after adding the sulfuric acid to the zinc rich dust contains not only lead, but usually tin, as well. Hot ammonium chloride (NH$_4$Cl) can be used to leach the lead cake forming a soluble ammonium chloride complex of lead chloride (PbCl$_2$) in solution as the leachate and a tin cake precipitate. The low solubility of PbCl$_2$, as well as the high solubility of ammonium chloride and other potential impurities (copper, zinc salts) allowed a high purity of lead chloride to be produced in two cold water washings of the crystalline product. The lead chloride produced by this process is of high purity and can be used for the production of other lead salts and compounds in conventional ways. Calcium chloride can be added to the ammonium chloride recycled from the leachate obtained in this process in order to prevent build-up of the sulfate ion which can render the leaching ineffective due to the removal of the chloride ion. Step 2 produces a lead compound and, optionally, a calcium compound.

In Step 3, the precipitation products resulting from the neutral filtration obtained by adding zinc oxide to the acid leach filtrate during Step 1 can be converted into soluble oxides by roasting at high temperature. These precipitation products are mostly sulfate salts of tin, copper and iron. Step 3 produces a soluble oxide product.

In Step 4, copper solids can be reclaimed easily from the filtrate, treated with a dilute acid, and then treated at high temperature in a furnace. Step 4 produces a copper product.

In Step 5, the cadmium solids obtained from the first and second cementation steps of Step 1 can be dissolved by sulfuric acid resulting in soluble sulfates of zinc and cadmium being formed. The zinc sulfate is recycled to the acid leach step of Step 1. Step 5 produces a cadmium compound product.

In Step 6, some of the tin left unleached from the lead cake in Step 2 is made soluble with hydroxide solutions, especially NaOH and KOH. These stannates solutions can be purified with the use of a soluble sulfhydrate salt. Step 6 produces zinc and tin insolubles.

In Step 7, the zinc/tin insolubles obtained from Step 6 can be treated with hot concentrated sulfuric acid. The zinc/tin insolubles can be used to produce zinc sulfate, the end product of Step 7, which can be recycled to the acid leach step of Step 1.

The Steps referred to above can be combined together into a reclamation process with the portion of zinc sulfate or other components that is not reclaimed in each Step being recycled in order to increase the efficiency of the reclamation. Each one of these steps can be a batch process with the portion that is not reclaimed being recycled. This entire process can also be conducted as a continuous process or process in which some of the steps are continuous and the remaining steps are conducted on a batch basis. For example, after the separation of the zinc sulfate product in Step 1, the remaining solution which may contain some crude zinc sulfate will be returned to the start of the process in Step 1. Likewise, after the formation of the cadmium sulfate in Step 4 and Step 5, the remaining zinc sulfate is returned to the start of the process in Step 1. After calcium chloride is added to the ammonium chloride washings following the precipitation of PbCl$_2$ in Step 2, the restored NH$_4$Cl is returned to the start of the process in Step 2. After the tin has been removed from the lead cake, has been treated with a hydroxide solution in Step 6, at least part of the solution can be returned to the start of the process in Step 6. After the precipitation of the basic sulfate precipitates from the zinc/tin sulfates in Step 7, the zinc sulfate can be returned to the start of the process in Step 1.

In the process invented, any zinc sulfate remaining in solution after the removal of the desired metal is returned to the start of the process of Step 1, while other remaining reactants are returned to the start of the process in which they are used.

It is the principal object of this invention to develop a process for the recovery of zinc, lead and tin from metallic containing materials.

It is another object of this invention to develop a process for recovering metallic elements from zinc rich dust.

It is still another object of this invention to develop a process for the removal of non-zinc metals from a zinc-rich starting material that may be present in metallic materials, particularly cadmium and copper, as a part of this process.

It is another object of this invention to be able to recover nearly all of the metallic materials contained in a starting material by a continuous process.

It is also an object of this invention to develop a process for the recovery of metals, whether in elemental form or in compounds that are of high purity, which are demanded for many purposes.

Yet another object of this invention is to recover ZnSO$_4$, CdSO$_4$, PbCl$_2$, and K$_2$Sn(OH)$_6$ produced in high purity.

A further object of this invention is to recover copper in a form suitable for on-site reclamation as metallic copper.

Another object of this invention is to provide a reclamation process which uses common and inexpensive materials to treat the various components throughout the process.

These objects, and other objects, features and advantages of this invention, will become more apparent to one skilled in the art when the following Detailed Description of the Preferred Embodiments is read in conjunction with the appended Figures.

DETAILED DESCRIPTION OF A PREFERRED EMBODIMENT

A process has been invented to reclaim zinc and lead, and optionally other metals and metallic compounds, from the dust produced by the recovery of copper from metallic products rich in zinc. It is especially useful in reclaiming such metals from the production process for electrical wire and cable, which frequently uses starting materials having copper, zinc and some other metals present. This process also can be used for any similar kind of mixed metal oxide dust which contains zinc as well as other metal oxides. If desired, copper, tin and cadmium also can be removed from the dust, if present, using the process of the invention.

Basic Reclamation Process

Figure 1A:
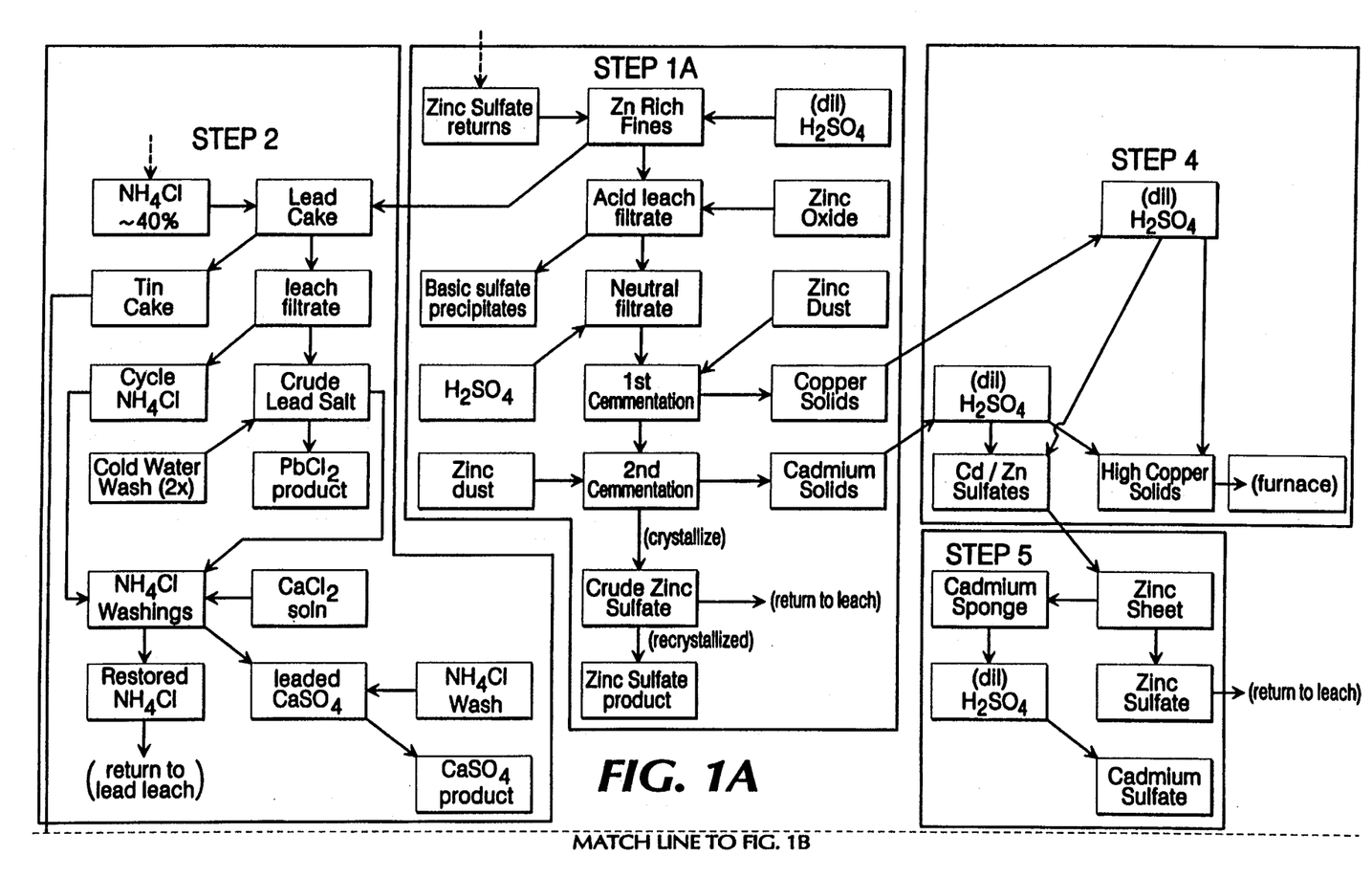
FIG. 1 is a basic flow diagram of the process of this invention.
Figure 1B:
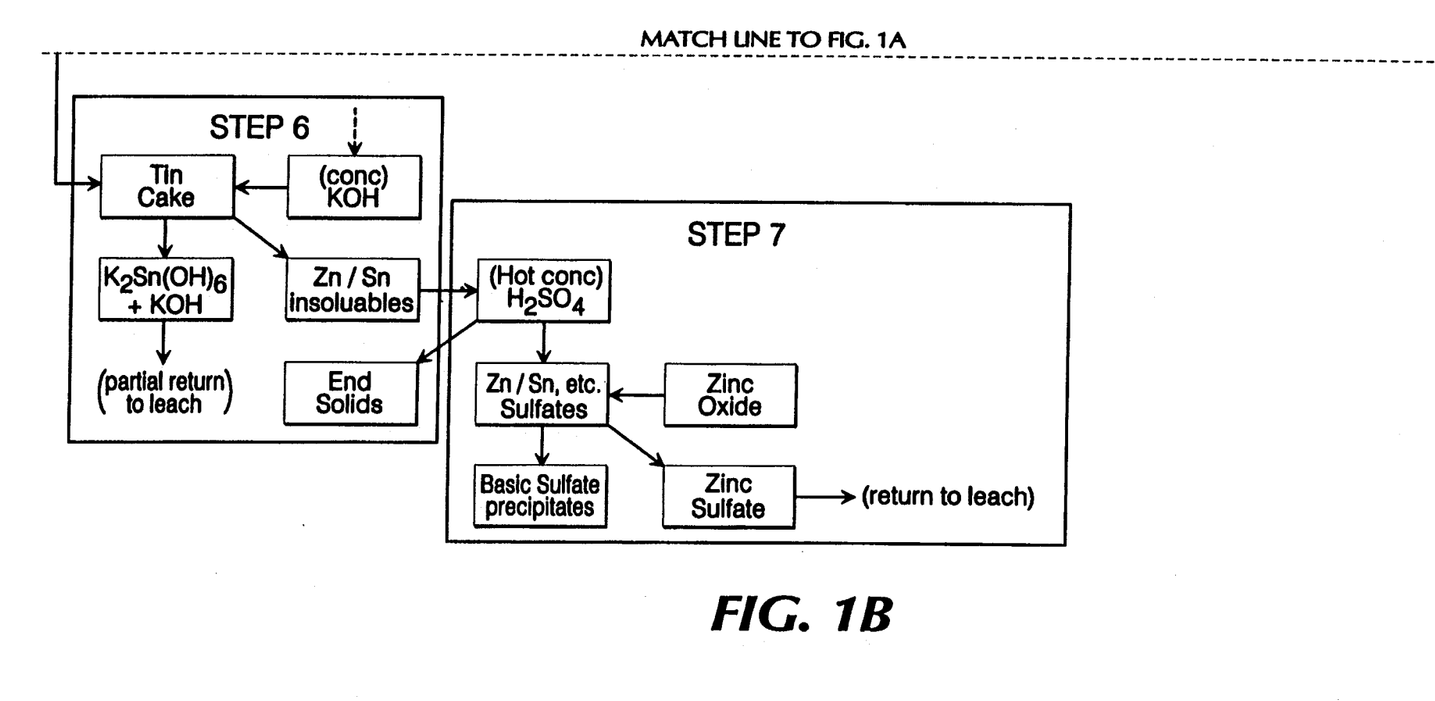

A flow chart of the entire process is set forth in FIG. 1. Step 1 is the basic zinc compound reclamation process, zinc being the component of greatest quantity in the feed dust, disclosed and claimed herein. Steps 2–7 are additional processes to recover other metals present in the feed dust, and can be combined with Step 1 as described to result in a number of complete reclamation processes, dependent on the composition of the feed dust, or feedstock.

Initially, if there is a significant amount of chloride in the zinc rich dust, which is the feed dust or feedstock, water washing of the dust can be utilized to remove the soluble chloride fraction prior to commencing the process set forth in FIG. 1. This water washing has been found to remove large amounts of chloride, usually in the form of zinc, lead, potassium and sodium salts. This water washing also results in the leaching out of small amounts of calcium, cadmium and copper, in addition to sulfate ions. The water washing or leaching conditions in Step 1 can be altered to change the amount and type of ions found in the leachate. For example, the wash water can be treated with zinc dust to remove the heavy metals. The zinc then can be precipitated out as a hydroxide, or as a carbonate. The solution can be neutralized and discarded or reused. If there is not a significant amount of chloride in the zinc rich dust, the water washing step can be dispensed with and the entire reclamation process started with either Step 1A or Step 1B as described below.

As illustrated in FIG. 1, the total reclamation process is a seven (7) step process. The entire process permits the reclamation primarily of zinc, lead and tin compounds from dust containing these elements or compounds thereof. The entire process also permits the recovery secondarily of other elements or compounds, including copper and cadmium. The basic process utilizes leaching, neutralization, cementation, and roasting steps.

Step 1 involves the leaching and cementation of a zinc sulfate product, with preferred Step 1A using sulfuric acid, and alternate Step 1B using ammonium bisulfate as the leachant.

Step 2 involves a leaching process of a lead cake produced in Step 1 to obtain lead chloride.

Step 3 involves a roasting process of the mostly insoluble sulfate salts of zinc, iron, tin, copper and arsenic produced in Step 1 to obtain metallic oxides of their respective metals. Products obtained in Step 3 can be returned to the basic leaching process of Step 1 or undergo further processing for use for other purposes as desired.

Step 4 involves treating copper solids obtained from a neutral filtrate in Step 1 with sulfuric acid to obtain copper.

Step 5 involves treating cadmium solids obtained from the first and second cementation steps of Step 1 with dilute sulfuric acid to obtain cadmium sulfate, which may be sold directly or recovered as a metal by reaction with metallic zinc sheets.

Step 6 involves treating tin found in the tin cake produced in Step 2 with a concentrated hydroxide, preferably NaOH or KOH, solution to leach out the tin present.

Step 7 involves treating the zinc/tin insolubles produced in Step 6 with hot sulfuric acid, resulting in the production of zinc sulfate, which is returned to the leach of Step 1 with the neutral precipitate being filtered and roasted.

Any one of the steps in this process can be used alone or in combination with any other step that is directly in sequence in the entire process. However, the efficiency and economy of the process is greatly improved if all seven (7) steps are utilized. The greatest efficiency and economy of the process is obtained when the solution remaining after the separation of the desired metals is recycled to an appropriate point, particularly with regard to recycling any zinc sulfate and zinc sulfate solutions to the initial leaching step of Step 1. For example, after the removal of a zinc sulfate product in Step 1, the remaining crude zinc sulfate and zinc sulfate solution is returned to the start of the process in Step 1. Metallic oxides obtained in Step 3 also can be returned to the basic leaching process of Step 1. Zinc sulfate formed by the addition of zinc sheet to the cadmium solution in Step 5 can be returned to the start of the process in Step 1. The zinc sulfate remaining in the solution after the precipitation of basic sulfates in Step 7 is returned at the start of the process in Step 1. One skilled in the art will understand that under certain circumstances it may not be desirable to recycle the remaining solution as it may be too small to make it worthwhile or may interfere with the purity requirements desired in a particular reclamation. Thus, in recycling, any zinc sulfate remaining in solution is returned to the start of the process in Step 1, while other reactants are returned to the start of the process step in which they are used.

Each step in this process can be conducted as a batch or continuous process. All of the steps may be combined and conducted as a continuous process. In some cases it may be desirable to conduct some of the steps as a batch process while others are conducted as a continuous process.

Step 1 Leaching of Zinc Rich Dust

The zinc rich dust feed may be treated using either a sulfuric acid leach or an ammonium bisulfate leach.

Step 1A Dilute Sulfuric Acid Leaching of Zinc Rich Dust

The zinc rich dust, or fines, can be treated by addition of the dust to a sulfuric acid solution, to form a slurry. This treatment causes the following major reactions to occur:

$$ZnO + H_2SO_4 \rightarrow Zn^{++} + SO_4^{--} + H_2O \quad \text{(fast, exothermic)} \tag{1}$$

$$CdO + H_2SO_4 \rightarrow Cd^{++} + SO_4^{--} + H_2O \tag{2}$$

$$CuO + H_2SO_4 \rightarrow Cu^{++} + SO_4^{--} + H_2O \text{ (slower)} \tag{3}$$

$$PbCl_2 + H_2SO_4 \rightarrow PbSO_4 \text{ (insoluble)} + HCl \tag{4}$$

Thus, metallic and sulfate ions are formed along with insoluble lead sulfate. Additional sulfuric acid is to be added until the solution remains acid (pH<2 and preferably pH~1). In this way, an economical minimum of acid is consumed. The rapid rate of reaction (1) allows this to be done with little delay. Reaction (1) releases a great deal of heat, and external heating of the solution may not be required. Reactions (2) and (3) take longer to go to completion during the leach stage and the levels of Cd and Cu in solution should be monitored. Leaching should continue until all of the extractable copper is dissolved. It is of some importance that the leachable Cu and Cd be removed before proceeding. It is preferable that a water rinse or second dilute leach take place in order to rinse the solids clean of any entrapped ions, and prevent contamination of the next leach steps.

Reaction (4) is of considerable importance in the overall process. Soluble lead chloride is present in these dusts and is converted to the highly insoluble lead sulfate. The abundance of sulfate ions present in solution greatly suppresses the solubility of lead ions. It is necessary to note, however, that due to reaction (4), the chloride ions are introduced into the leach liquor. Zinc sulfate targeted for the electro-chemical uses must be kept low in chloride, but even so, the high solubility of zinc chloride makes contamination unlikely, and easy to remove by recrystallization.

Other reactions of minor occurrence during the leach include:

$$FeO + H_2SO_4 \rightarrow Fe^{++} + SO_4^{--} + H_2O \tag{5}$$

$$Al + 3/2 H_2SO_4 \rightarrow Al^{+++} + 3/2 H_2 \tag{6}$$

$$As_2O_3 + 3H_2O \rightarrow 2H_3AsO_3 \text{(soluble in strong acid and base)} \tag{7}$$

Potassium, sodium, calcium and magnesium compounds are rendered soluble in the leaching process and taken into solution. Traces of tin and lead also can be found in the solution. Filtering separates the leached material from the solid material. The solid material has been named "lead cake" due to its high lead sulfate content, however the lead cake does contain other compounds, particularly tin compounds.

Zinc oxide or zinc hydroxide can be added to the acid leach filtrate to neutralize the solution after reaction (1) above. The addition of zinc oxide or zinc hydroxide causes the formation of the insoluble basic sulfate salts of tin, iron, copper and lead, which precipitate out. This step removes almost all of the tin, iron and lead found in solution. Potassium is removed to some extent as an iron complex salt. Heating the solution during this process will speed the formation of a precipitate, as well as increase the extent of precipitation. The pH levels of the zinc oxide or zinc hydroxide treated filtrate should be in the 5–6 range. The solid formed in this step is referred to as the "neutral precipitate". This process is referred to in the art as jarosite precipitation, or iron purification, as the precipitation of the iron co-precipitates other impurities. Conditions that can be altered include the addition of excess dissolved iron to improve co-precipitation, as well as the addition of oxidizing agents to improve the extent and quality of the iron precipitate.

After filtering out the neutral precipitate, the neutral filtrate solution pH is adjusted to become slightly acidic (pH 4–5) by the addition of an acid, preferably sulfuric acid, as illustrated in FIG. 1. The solution then is measured for copper and lead content. A determined amount of finely divided zinc dust (a stoichiometric excess) is added to the neutral filtrate solution at 80°–90° C. with good mixing. An electrochemical exchange takes place based on the relative position of the components on the electromotive series. Major reactions include:

$$Zn^o + Cu^{++} \rightarrow Zn^{++} + Cu^o \tag{8}$$

$$Zn^o + Cd^{++} \rightarrow Zn^{++} + Cd^o \tag{9}$$

$$Zn^o + Pb^{++} \rightarrow Zn^{++} + Pb^o \tag{10}$$

Heavy metal ions in the neutral filtrate are reduced to the metallic form and zinc ions enter the filtrate. Initially, these reactions are based only on random collision with zinc metal with the rates of removal being identical. However, as the surface of the zinc becomes replaced by other metals, these reactions follow:

$$Cd^o + Cu^{++} \rightarrow Cd^{++} + Cu^o \tag{11}$$

$$Cd^o + Pb^{++} \rightarrow Cd^{++} + Pb^o \tag{12}$$

Cadmium, like zinc, has the ability to replace copper and lead ions in the neutral filtrate, and, as a result, the neutral filtrate becomes almost completely depleted in lead and copper, but the cadmium tends to remain in the neutral filtrate. Advantage can be taken of this characteristic to separate all or nearly of the cadmium from the neutral filtrate in the first cementation step as shown in FIG. 1.

Once copper levels have been greatly reduced, observable by the solution becoming clear or by instrumental methods, the solids obtained from the first cementation are copper metal, zinc metal and oxide, cadmium and lead. If desired, additional sulfuric acid may be added directly to the solution to selectively redissolve the zinc and cadmium present. Metallic copper and lead are not affected by dilute sulfuric acid. If additional $H_2SO_4$ is added, the reactions include:

$$Zn^o + H_2SO_4 \rightarrow Zn^{++} + SO_4^{--} + H_2 \tag{13}$$

$$Cd^o + H_2SO_4 \rightarrow Cd^{++} + SO_4^{--} + H_2 \tag{14}$$

The solution then can be titrated with ZnO to a pH of 4–5. Since the majority of the solid produced is copper, the solid precipitate is referred to as the "copper solids", however the copper solids does contain other compounds, particularly cadmium and zinc compounds. Due to their fine state of division, the metals in the copper solids rapidly oxidize on exposure to the air. Copper oxide is attacked readily by sulfuric acid, and therefore dissolution should take place in the solution directly after the cementation is complete.

Zinc dust cementation can be repeated to remove the cadmium present. By determining the amount of cadmium in solution, a specific amount of zinc dust can be added as before, namely a stoichiometric excess. The solids generated in this step are called the "cadmium solids", and are rich in zinc, zinc oxide and cadmium.

The solution is filtered free from cadmium solids and now contains a greatly reduced amount of cadmium. The majority of the components of interest in the solution is zinc, with some potassium, sodium, and minor amounts of aluminum, calcium, magnesium and iron. Copper, lead, tin and cadmium concentrations should be present at no greater than a few parts per million level.

After the second cementation step, the resulting zinc sulfate solution is heated to evaporate some excess water to reduce its volume in order to precipitate the fine zinc sulfate crystals of the monohydrate form, or alternately, allowed to cool in order to form the heptahydrate crystals. Sulfuric acid is added to restore the acid concentration of the cycling solution to the determined level, and the solution containing some zinc sulfate and other compounds that is not precipitated is returned to repeat the process of Step 1A. Sulfuric acid may be added before the crystallization step in order to produce a higher purity product, if it is beneficial. Recrystallization of the zinc sulfate will produce a very high purity product. The product can be dehydrated if required by heating.

Step 1B Ammonium Bisulfate Leaching of Zinc Dust

In place of treating the zinc rich dust with sulfuric acid as in Step 1A, the zinc rich dust can be treated with ammonium bisulfate ($NH_4HSO_4$). Ammonium bisulfate is a white hygroscopic solid at room temperature which can be formed by addition of equal molar amounts of ammonia and sulfuric acid:

$$NH_4OH + H_2SO_4 \rightarrow NH_4HSO_4 + H_2O \quad (15)$$

or alternatively, by the combination of ammonium sulfate and sulfuric acid:

$$(NH_4)_2SO_4 + H_2SO_4 \rightarrow 2\ NH_4HSO_4 \quad (16)$$

Figure 2:
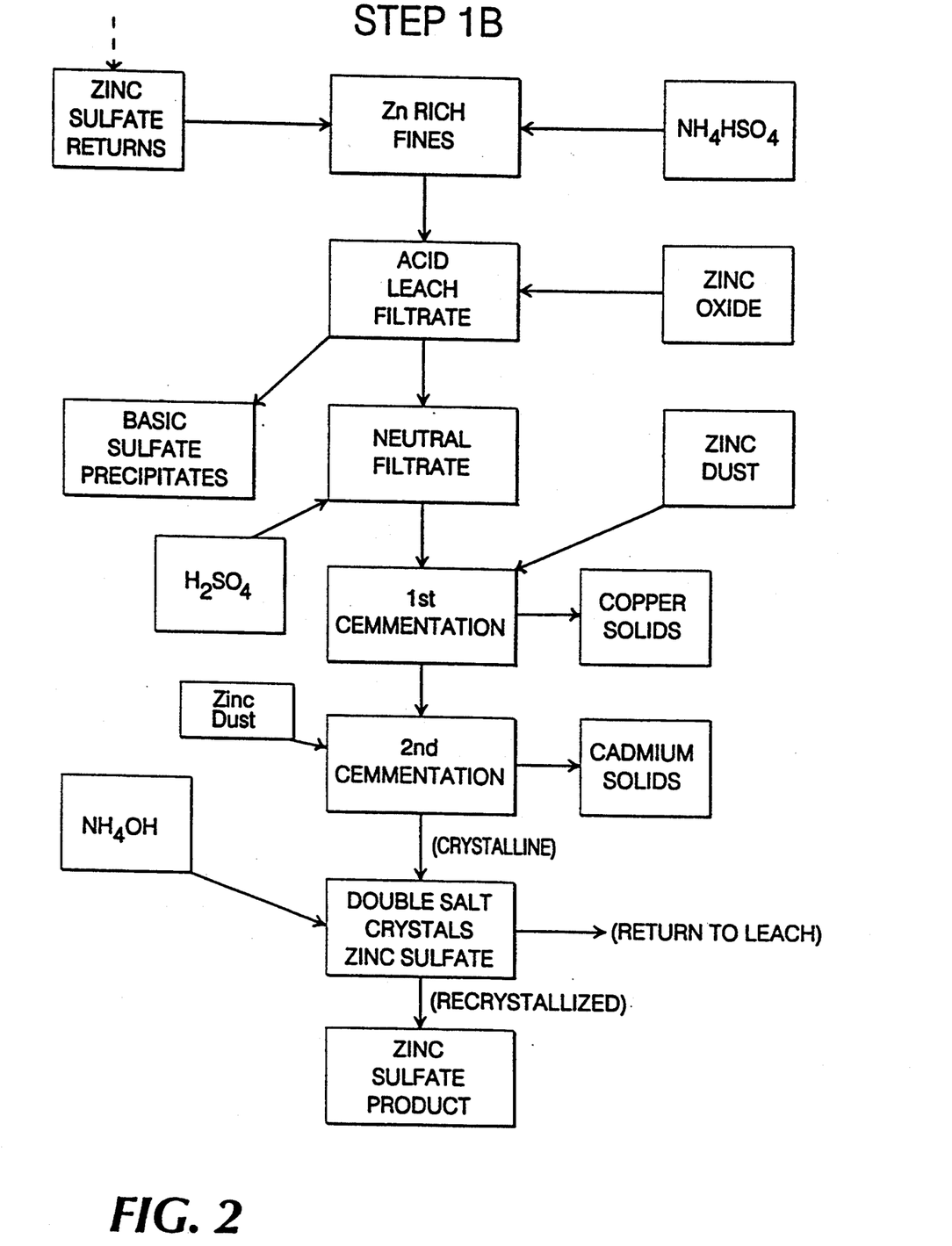
FIG. 2 is a basic flow diagram of Step 1B which is an alternative process to what is shown in Step 1A in FIG. 1.

The steps followed in using ammonium bisulfate to leach the zinc dust as shown in FIG. 2 (Step 1B) are the same as the steps followed when sulfuric acid leaching is used. However, the presence of ammonium ions produces some double salts which have limited solubility. A 25% by weight solution of the bisulfate was found to be the maximum allowable concentration in order to avoid crystallization of the zinc double salt $(NH_4)_2Zn(SO_4)_2$ at high temperatures.

The solution leached with ammonium bisulfate can be subjected to the same treatments as were used with the sulfuric acid leach, that is the zinc oxide neutralization of the leach filtrate and the addition of zinc dust and sulfuric acid to the neutral filtrate. The filtrate then is subjected to the first and second cementation steps as indicated in FIG. 2. After these steps, cooling the solution will result in the formation of double salt crystals. These crystals can be collected and dissolved or the entire solution can be decomposed by the following treatment with ammonia:

$$(NH_4)_2Zn(SO_4)_2 + 2\ NH_4OH \rightarrow Zn(OH)_2 + 2\ (NH_4)_2SO_4 \quad (17)$$

This treatment also can be used with the zinc sulfate solutions:

$$ZnSO_4 + 2\ NH_4OH \rightarrow Zn(OH)_2 + (NH_4)_2SO_4 \quad (18)$$

In this process, an excess of ammonium hydroxide should be avoided as it will result in the formation of a soluble zincate ion under highly basic conditions. Zinc hydroxide is very insoluble. The ammonium sulfate produced remains in the solution. The insoluble zinc hydroxide is washed in hot water (approximately 150° C.) and converted to zinc oxide by heating:

$$Zn(OH)_2 \rightarrow ZnO + H_2O \quad (19)$$

The water present becomes increasingly difficult to remove, and much higher temperatures (over approximately 150° C.) are required to completely dehydrate the product. The product is somewhat chalk-like and milling is required to break up the solids. Material made in this manner is ideal for the neutralization processes.

A second possibility is the use of ammonium carbonate or other carbonate solution to precipitate zinc as the carbonate. This material could then be calcined at approximately 300° C. to produce zinc oxide.

$$ZnCO_3 \rightarrow ZnO + CO_2 \quad (20)$$

Zinc oxide made in these processes can be used for the neutralization of the acid leach filtrate as shown in FIG. 2. The ammonium sulfate solution obtained after the zinc precipitation step can be divided into two streams, one of which is used for the production of zinc sulfate product and the other recycled back into the process in Step 1B as was done in Step 1A. The recycled stream is analyzed and a measured amount of sulfuric acid is added to regenerate ammonium bisulfate for the next leaching process.

Ammonium sulfate can be recrystallized from the solution to produce a pure grade for sale. Any zinc that is in the solution needs to be removed by a second step of adding more ammonium carbonate to the solution. Ammonium sulfate is used in agriculture in large quantities.

Step 2 Lead Cake Leaching

The lead cake contains mostly lead sulfate and tin oxides. The maximum amount of lead can be removed from the lead cake by leaching it in a hot ammonium chloride ($NH_4Cl$) solution of high concentration (e.g. about 40%) as is shown in FIG. 1. Copper and zinc which remain after the first stage acid leaching also can be removed. The reactions that result in this removal include:

$$PbSO_4 \rightarrow Pb^{++} + SO_4^{--} \quad (21)$$

$$Pb^{++} + 2\ Cl^- \rightarrow PbCl_2 \quad (22)$$

$$PbCl_2 + 2\ NH_4Cl \rightarrow PbCl_2 \cdot 2\ NH_4Cl\ (soluble\ complex) \quad (23)$$

Insoluble tin compounds precipitate during this leach and are filtered from the solution. The leach filtrate solution then is cooled and lead chloride crystals of complex form are produced. Impurities such as copper are carried out of the solution. The crude complex of lead chloride crystals is washed free from the ammonium chloride salt and any impurities present using cold washes. The low solubility of PbCl$_2$(1g/100ml at 20° C.) as well as the high solubility of ammonium chloride and other potential impurities (copper, zinc salts) allow a high purity lead chloride to be reached in two cold water washings. The washing is done at cold temperatures (below approximately 40° C.) to reduce the solubility of the lead and prevent the formation of the oxychloride. The washings are then concentrated and recombined with the mother liquor in order to restore the ammonium chloride concentration, As the reactions in this section show, the sulfate ion tends to build up in the solution and could cause the leaching to become ineffective. At the same time that this occurs, the chloride ion is removed. In order to correct this imbalance, calcium chloride can be added to the ammonium chloride washings as illustrated in FIG. 1. The calcium chloride can be generated from hydrochloric acid and lime via:

$$2\ HCl + CaO \rightarrow Ca^{++} + 2\ Cl^- + H_2O \quad (23)$$

or $$2\ HCl + Ca(OH)_2 \rightarrow Ca^{++} + 2\ Cl^- + 2H_2O \quad (24)$$

The correct amount of calcium chloride that needs to be added depends on the amount of chloride removed via lead chloride. An excessive amount of calcium chloride should not be added so as to prevent later contamination of calcium sulfate in the lead product. Therefore, in order to suppress calcium solubility, a small amount of sulfate ion must be tolerated in the recycled solution.

The ammonium chloride solution is heated and the correct amount of a calcium chloride solution is slowly added with good mixing. In several minutes (5–10) the calcium sulfate hydrate product begins to precipitate out of solution. Reactions include:

$$Ca^{++} + 2\ Cl^- + 2\ NH_4^{++} + SO_4^{--} \rightarrow CaSO_4 + NH_4^+ + Cl^- \quad (25)$$

Once the calcium ion level has fallen to a minimum, the ammonium chloride solution is filtered free from the sulfate product. The ammonium chloride is recycled by adding it to the lead cake in Step 2. Lead also is found in this product in small amounts (<1%) and may be removed by a second ammonium chloride wash. Water washes do not appear effective in removing lead from this gypsum product.

The lead chloride product generated in this process is of high purity and can be used for the generation of other lead salts and compounds, using methods known in the art. The lead chloride product may be added to a cold solution of sodium carbonate. This causes the production of the highly insoluble lead carbonate.

$$PbCl_2 + Na_2CO_3 \rightarrow PbCO_3 + 2\ NaCl \quad (26)$$

Step 3 Neutral Precipitation Products Treatment

Neutral precipitation products obtained from the first acid leach filtrate and second cementation steps in Step 1 are mostly insoluble basic sulfate salts of zinc, iron, tin, copper and arsenic and as such should be reclaimed. This step is not specifically illustrated in FIG. 1. These materials can be converted into their selectively soluble oxides by roasting at high temperature (>400° C.). Roasting products include SnO$_2$, CuO and Fe$_2$O$_3$. These products then can be returned directly to the leaching process. In this way, tin trapped in the Zn$_2$SnO$_4$ form eventually can be reclaimed as the stannate salt. The iron can be removed magnetically to return it to the furnace for purification into the pure metal or mixed with carbon or sold to a steel producer as a feed material.

Step 4 Copper Solid Treatment

The copper solids from Step 1 are treated with a dilute H$_2$SO$_4$ solution to remove excess cadmium and zinc as the sulfates. As indicated in FIG. 1, the remaining high copper solids are best treated at high temperatures to directly reclaim the high copper content of these solids. This can be done on site by returning them to the furnace for purification of the copper. They mainly contain copper metal. Copper oxide, lead and zinc metal may be present in addition to zinc oxide and some cadmium.

Step 5 Cadmium Solid Treatment

The cadmium solids obtained from the first and second cementations steps of Step 1 consist mainly of zinc metal and oxide, cadmium metal and oxide, and very minor amounts of lead and copper metal. The cadmium and zinc sulfates can be dissolved selectively by use of a minimum of dilute sulfuric acid (warm) as shown in Step 4. The resulting solution can be adjusted to a pH of 4–5 by addition of zinc oxide. The solution now contains mainly the sulfates of zinc and cadmium. A sheet of zinc metal can be placed in a bath, and a high purity cadmium sponge will form on its surface replacing some of the zinc (Reaction 27 below). The cadmium sponge can be separated, rinsed and redissolved in sulfuric acid to produce high purity cadmium sulfate (Reaction 28 below). Air oxidation of the cadmium will increase the rate of attack by sulfuric acid solutions, and form water as the only by-product. This oxidation greatly increases the rate of dissolution.

$$Cd^{++} + Zn^o \rightarrow Cd^o\ metal\ (sponge) + Zn^{++} \quad (27)$$

$$Cd^o + H_2SO_4 \rightarrow CdSO_4 + H_2(slow) \quad (28)$$

$$CdO + H_2SO_4 \rightarrow CdSO_4 + H_2O(fast) \quad (29)$$

This cadmium sponge product also may be sold directly as the metal. The cadmium sponge also may be formed by electrolysis of the cadmium/zinc solution. Any zinc sulfate in the solution after separation can be recycled to the start of Step 1.

Step 6 Tin Cake Leach

The majority of tin found in the metal dust is in the oxide form SnO$_2$. This material is highly insoluble in acid, but is rapidly dissolved in hot, concentrated hydroxide solutions, especially NaOH and KOH. In the tin plate industry, these solutions are commonly referred to as "stannates".

The insoluble tin cake material from the lead sulfate leach in Step 2 (once free from extractable lead) is treated in a hot, concentrated solution of the chosen hydroxide until the leaching of the tin is thought acceptable. Attention has to be given to the relative levels of potassium (or sodium) and tin found in solution. Some heavy metals, especially lead and zinc, may be leached as well, and purification of the stannate solution may be required. This may be accomplished by the use of a soluble sulfhydrate salt, such as sodium sulfhydrate (NaSH). Addition of the sulfhydrate will cause the precipitation of these heavy metals from the solution. The solubility of the stannates is reduced when the free hydroxide levels are increased, this can be used to advantage to precipitate the stannate salt from solution when the solutions are replenished in hydroxide.

Step 7 Zinc/Tin Insolubles

The zinc/tin insolubles are believed to contain a majority of the compound $Zn_2SnO_4$, which was insoluble in all of the previous treatments. This material can be treated with hot concentrated sulfuric acid and dissolved. This step is a non-selective step. Any neutralization reactions, without water, in the first dilute leach can result in a violent exothermic reaction. By the time the material reaches the Zn/Sn insoluble stage, all of the components leading to a violent reaction have been removed and heat only needs to be applied to the acid. At this stage of the process, the solid mass is only about 2% of the total dust mass to be treated. The Zn/Sn insolubles are mixed with hot concentrated sulfuric acid and allowed to react for 10 to 20 minutes. It is then filtered. The Zn/Sn sulfate is made neutral with zinc oxide. A basic sulfate precipitate high in tin similar to the neutral precipitate is formed. This is filtered out and roasted. The solution remaining contains mainly zinc sulfate and is recycled to first dilute leach for eventual recovery. The small volume of the solids at this stage may make this recovery unsuitable, and the solids can be returned directly to the furnace for eventual reentry into the process.

Total Solution Recycling Process

The process of this invention can be set up as a recycling process for each Step involving the recycling of any solution remaining after separation of the desired metals or metallic compounds. Alternatively, this process can be set up as a total solution recycling process in which each of the Steps is a continuous Step and the entire process is a continuous process. As in the case of a batch process, any solution containing a reactant which remains after separation of the desired metals or metallic compounds is returned to the start of the process in which the reactant is used. For example, the zinc sulfate remaining in the solution after the second cementation step in Step 1A can be returned to the leach after the crystallization of that portion of the zinc sulfate product that can be crystallized. This is also true of Step 1B when ammonium bisulfate is used to treat the zinc dust. A portion of the double salt crystals of zinc sulfate that is not crystallized to a zinc sulfate product is returned to the start of the process in Step 1B. The ammonium chloride which is filtered free from the sulfate product produced in Step 2 can be returned to the start of the process in Step 2 by adding it to the lead cake.

After the insoluble basic sulfate salts of zinc, iron, tin, copper and arsenic have been converted to soluble oxides by roasting in Step 3, they can be returned to the start of the process in Step 1 for recycling. The zinc sulfate that is formed in Step 5 in the formation of a cadmium sponge can be returned to the leach in Step 1.

After separation of the Zn/Sn insolubles in Step 6, the remaining KOH can be returned to the start of the process in Step 6. After filtering out the sulfate precipitate in Step 7, the remaining zinc sulfate solution can be returned to the start of the process in Step 1.

Ideally, all seven (7) Steps above are combined into either separate batch processes or with each of the steps being a continuous process so that the entire process involving all seven (7) Steps is a continuous process. Alternatively, some of the Steps may be set up as a batch process and others as a total solution recycling process (i.e., continuous process). A key point is that in this process filtrates remaining after precipitation of the desired metallic solids are returned to the appropriate part of the process for recycling. In some cases, not all of these filtrates or the entire quantity obtained will be recycled depending upon the objectives of the reclamation process. In some situations, in order to obtain higher purity where the filtrate is small in quantity, the filtrate may not be recycled in the process.

Examples

The following Examples demonstrate the process for removing zinc, copper, cadmium and lead from zinc rich dust obtained in the processing of electrical cables. A typical zinc rich dust is shown below, but any feed dust containing zinc can be treated with this process.

A typical zinc rich dust comprises:

| Component | % by Weight | Comment |
|---|---|---|
| Zinc | 40 | ZnO with some $Zn_2SnO_4$ |
| Lead | 25 | $PbSO_4$ with $PbCl_2$ |
| Copper | 2.7 | CuO assumed |
| Tin | 1.2 | $SnO_2$ with some $Zn_2SnO_4$ |
| Sodium | 1.0 | |
| Potassium | 0.7 | |
| Calcium | 0.4 | |
| Iron | 0.2 | |
| Cadmium | 0.07 | CdO assumed |
| Magnesium | 0.05 | MgO assumed |

Trace amounts of Li, Ni, Cr, Mn, Ba, V, Co, and Hg.
Indeterminate amounts of As, Sb, Be, and Bi.

Example 1

10 g of the zinc rich dust produced in the processing of electrical cable was leached with 20 ml distilled water for 10 minutes. The amount of 0.33 g of material was found in the leachate from the dust and the chloride content was determined by AgCl titration. This dust, when washed with water, had 0.1 g of chloride leached out. The major components found in the leachate were lead, zinc, potassium and sodium. This water washing is only necessary in this process if there is a significant amount of chloride ion that may interfere with the remainder of the processing steps.

Example 2

250 g of the zinc rich dust produced in the processing of electrical cables was added to a large beaker, and 500 ml of distilled water added to create a slurry. A stir-bar was added and used to mix the slurry. Concentrated sulfuric acid was added slowly, keeping note of the pH of the solution. Heat was released by the neutralization heat of reaction (1) as well as the heat from dilution of the acid. 166.2 g of acid were added to maintain a constant acidity. A zinc oxide equivalent is:

166.2 g/100 g/mole H₂SO₄×81.35 g/mole
ZnO=135 g (54% mass)

The acid consumed is required to react with other oxides present in the dust (CuO, K₂O, CaO, etc.) and adding a slight excess for acidity, this slightly higher estimate is expected (measured zinc oxide levels (45–50%)).

The solution was then filtered rapidly to determine relative rates of dissolution. The solution obtained by filtration was green in color, and found to contain the elements set forth in Table 1.

TABLE 1

| Component | Amount (g) | Component | Amount (g) |
|---|---|---|---|
| Zn | 73+ | Al | 0.17 |
| Cu | 2.9 | Mg | 0.08 |
| Na | 1.5 | Fe | 0.07 |
| K | 1.2 | Pb | 0.05 |
| Cd | 0.29 | Sn | 0.02 |
| Ca | 0.25 | | |

The solids were washed for a time (15 min.) with warm, dilute sulfuric acid, filtered and the washings analyzed. The results are set forth in Table 2.

TABLE 2

| Component | Amount (g) | Component | Amount (g) |
|---|---|---|---|
| Zn | 7.7 | K | 0.12 |
| Cu | 1.2 | Pb | 0.05 |
| Fe | 0.26 | Cd | 0.03 |
| Ca | 0.21 | Mg | 0.02 |
| Na | 0.19 | Sn | 0.21 |
| Al | 0.13 | | |

Based upon this data, it is clear that the dissolution of iron, copper, calcium, tin and aluminum are slower reactions than in the case of zinc. Further, it shows the need for a washing stage between separate leach steps to avoid contamination and loss of product.

The weight of the air dried lead cake was 124 g (~50% mass). The leach solutions were combined, and ZnO added to neutralize to a pH of 5–6 as shown in FIG. 1. This caused the formation of a mixed basic sulfate precipitate referred to as the neutral. The dried precipitate was 2.91 g in weight and was analyzed to contain the metals shown in Table 3:

TABLE 3

| Component | Amount (g) | Wt. % |
|---|---|---|
| Zn | 0.70 | 24.0 |
| Fe | 0.20 | 7.00 |
| Sn | 0.22 | 7.80 |
| Cu | 0.19 | 6.40 |
| Pb | 0.026 | 0.90 |
| K | 0.008 | 0.29 |

Levels of zinc in the solids can be reduced by careful addition of zinc oxide. The solution filtered free from the neutral precipitate was analyzed to contain the metals contained in Table 4:

TABLE 4

| Component | Amount (g) | Component | Amount (g) |
|---|---|---|---|
| Zn | 80 | Al | 0.25 |
| Cu | 3.5 | Fe | 0.1 |
| Na | 1.5 | Mg | 0.1 |
| K | 1.2 | Pb | 0.03 |
| Ca | 0.4 | Sn | 0.03 |
| Cd | 0.29 | | |

Example 3

Multiple Sulfuric Acid Leach of the Zinc Rich Dust.
Leach #1

100.01 g of the zinc rich dust was made into a slurry first with 100 ml of distilled water. This proved to be too viscous for mixing and an additional 100 ml of distilled water was added. This formed a well suspended slurry with mixing provided by a stir bar. Concentrated sulfuric acid was added slowly to the slurry over a seven minute period in order to alter the pH of the solution to a constant pH of ~1 to insure the complete dissolution of zinc and other oxides. The pH was monitored using pH paper during the acid addition. The solution remained acidic for several minutes after a total of 47.34 g of sulfuric acid had been added.

H₂SO₄ (~97%) 47.34 g/~100 g/mole=0.473 mole

ZnO (estimated)=0.0473 mole×81.38 g/mole=38.5 g as ZnO

The pH of the solution slowly lost acidity, and at 10 min., 3 additional grams of acid were added to maintain a pH of ~1.

3 g/~100 g/mole=0.03 mole added total added=0.503 mole H₂SO₄

End concentration of acid: 200 ml water +50.34 g H₂SO₄~20% by weight.

A temperature rise from 23° C. to 75° C. was noted in the solution, resulting from the dilution of the acid as well as from the heat of neutralization involving zinc oxide. The solution was allowed to mix for 30 minutes total time, and then vacuum filtered through paper. The resulting solution contained fine suspended particles and was re-heated and passed through a fine membrane filter, in order to remove the fine suspended material. The solid material was washed in distilled water, and collected, the washings saved. Samples of the washings and the filtered solution were collected for analysis. The solid was oven dried at 110° C.

The acid leach solution was heated and 0.92 g of zinc oxide (Oxinol brand) added. The pH of the solution slowly rose to a pH of 4–5. Mixing of the solution using a stirbar was continued for 20 min. This step seemed to greatly clarify the solution. A sample was taken to determine the effects of the zinc oxide addition, as well as to establish the proper amounts of zinc to use in the cementation steps. The neutral solids weighed 1.63 g.

The dry weight of the lead cake solid was 57.66 g, with 42.34 g of material therefore removed in the first leach step. This closely matches the zinc oxide acid equivalent stated before.

Leach #2

The process was repeated using the cemented solution, too low in zinc for crystallization, using an additional 100.00 g of zinc rich dust. The dust was added slowly to the existing solution, approximately 290 ml. In order to obtain an acidic condition, slow addition of 50.19 g of sulfuric acid was required. The reaction was continued for one hour. The solution was filtered crudely through paper, and the solid material rinsed in the funnel. The small size of the dust makes benchtop filtration slow and tedious. A total of 44.44 g was leached from the zinc rich dust. The neutralization step required 1.75 g of ZnO and produced 2.41 g of neutral solids. 1 g of zinc dust was added for cementation. Still, zinc sulfate levels were too low for crystallization to occur.

Leach #3

The third leach used 100.00 g of zinc rich dust, and required 51.4 g of sulfuric acid to be added. To test the effect of iron, 1.00 g of ferric sulfate was added at this time. Filtration was difficult due to the slow rate and the crystallization of the sulfate product in the filter. 6.0 g of ZnO was added and generated 8.40 g of neutral solids. 1.0 g of zinc dust was used for cementation.

TABLE 5

| Leach | Components in cycled solution (in ppm +/− 4%) | | | | | | | | | | | Zinc (% wt) |
|---|---|---|---|---|---|---|---|---|---|---|---|---|
| | Pb | Sn | Mg | Ca | K | Na | Cu | Cd | Fe | Al | Mn | |
| 1a | 26 | <12 | 519 | 6 | 65 | 178 | 1723 | 26 | 74 | 271 | 2 | 9.0% |
| b | 13 | <12 | 546 | 17 | 78 | 188 | 1602 | 19 | 53 | 92 | <1 | 9.5% |
| c | 11 | <12 | 463 | 7 | 85 | 151 | 11 | <4 | 52 | 9 | <1 | 8.3% |
| 2a | 448 | <12 | 645 | 8 | 91 | 219 | 1109 | 17 | 89 | 201 | <1 | 11.4% |
| b | 13 | <24 | 703 | 10 | 101 | 234 | 1090 | 12 | 44 | 70 | <1 | 12.4% |
| c | 17 | <12 | 662 | 12 | 105 | 225 | 4 | <2 | 32 | <3 | <1 | 12.0% |
| 3a | 1466 | 190 | 677 | 9 | 98 | 298 | 1134 | 20 | 430 | 173 | 3 | 14.4% |
| b | 39 | 14 | 686 | 11 | 102 | 288 | 951 | 14 | 378 | 89 | 2 | 14.6% |
| c | 17 | <12 | 667 | 9 | 103 | 270 | 61 | 9 | 108 | 37 | 2 | 13.6% | a) after leaching
b) after neutralization
c) after cementation step:

As one can observe from the above data in Table 5, little contamination of the solution was detected. The elements lead, copper, cadmium, aluminum and iron are controlled by the process steps of neutralization and cementation. Calcium is kept insoluble by the formation of calcium sulfate. Other components, such as sodium, potassium and magnesium should not cause any harmful effect on the zinc sulfate product.

Example 4

Analysis of the solutions obtained during the process indicated that As was leached from the zinc rich dust in the acid leach step of Step 1. A leach was done to test methods to control the levels of arsenic present. 100.01 g of dust was leached. The acid solution contained 425(±6) ppm as As. This represents about 40% of the arsenic present in the dust (~3700 ppm). The solution was divided into two volumes of equal size.

Solution A was first treated with ferric sulfate and then neutralized zinc oxide, whereas solution B was treated with zinc oxide alone. The iron treatment was carried out as follows: first 2.0 g of ferric sulfate, $Fe_2(SO_4)_3 \cdot n\ H_2O$, was added to 275 g of the acid leached solution, and allowed to dissolve. The solution was heated and 6 g of zinc oxide slowly added to neutralize the solution. Boiling was allowed to continue to coagulate the solids as stated in Zinc, The Science and Technology of the Metal, Its Alloys and Compounds, by C.H. Mathewson (Reinholt Publishing Corp., 1959) at 183–184.

The reaction in solution B was done in the same manner, lacking in only the iron sulfate. After the neutralization step, the amount of As present dropped to 51 (±8) ppm in Solution A and 72(±5) ppm in Solution B. This is a removal rate of about 90%. Cementation was done as usual, using 1 g Zn dust, and cementation was allowed to continue for 1 hour. The As remaining in the solutions was in the 25 ppm range. Arsenic, as well as antimony, form toxic hydrides in the presence of hydrogen. Arsine, $AsH_3$ can form when arsenic containing compounds come in contact with zinc and sulfuric acid. Arsine is an extremely toxic gas, with some solubility in water so that normal safety precaution should be employed.

Example 5

A 250 g sample of the 40% ammonium chloride solution was prepared and reagent lead sulfate was slowly added to the solution at 105° C. with mechanical stirring. The solution was able to dissolve 12.9% lead sulfate by weight. The crystalline product produced by cooling was analyzed by PD to be a lead chloride-ammonium chloride complex. Washing of the complex produced lead chloride salt, also analyzed by PD.

Example 6

The lead cake generated in the first leach (124 g) was added to a 40% by weight solution of ammonium chloride (400 g of $NH_4Cl$/600 g of distilled water). The ammonium chloride completely dissolved at about 83° C. The solution was filtered at the end of 30 min. The solution was allowed to cool, and crystals began to form in large amounts. The crystals were a light ice-blue in color, due to a copper impurity present. The crude complex contained 33.9% as lead, 0.4% as copper, and 0.05% as zinc.

Two cold water washes of the product were done to remove ammonium chloride from the product. The product was free from the blue color, as the copper was rather soluble. The washings were combined, reduced in volume and added back to the mother liquor. The final product contained 0.01% copper as impurity.

A limited amount of calcium chloride was dissolved in distilled water and added to the ammonium chloride solution. Mixing was done with a stir-bar. After several minutes a white precipitate began to form, and time was allowed for complete precipitation to occur. This was separated and analyzed:

22.0% as Ca (23% in pure $CaSO_4.2\ H_2O$)
0.55% as Pb
0.20% as Na

An attempt was made to wash out this lead in hot water washes, but no effect was observed. The tin cake generated retained some soluble lead and was returned to a second lead leach to insure complete lead removal. End weight of tin cake was 17 g.

The restored ammonium chloride solution was analyzed:

1.85% as lead
0.07% as copper
0.08% as calcium
0.03% as zinc

Example 7

A sample of the lead chloride produced in Example 5 was added to a solution containing excess sodium carbonate. The solution was mixed at room temperature for one hour. The solid was filtered free from the solution and analyzed by PD to be lead carbonate. A second sample was added to a hot ~95° C. solution of excess sodium carbonate, and allowed to react for one hour. The solid material was filtered out and analyzed by PD to contain a mixture of basic lead carbonate (hydrocerussite, $Pb_3(CO_3)_2(OH)_2$) and basic sodium-lead carbonate ($NaPb_2(CO_3)_2OH$). 3.58 g of a lead chloride product produced in a lead leach step by dilution of the ammonium chloride solution was added to 20 ml of distilled water containing 1.40 g of sodium carbonate. This was mixed at room temperature (about 22° C.) for 40 minutes and then filtered through a membrane filter to remove the solid component. The dried solid weighed 3.21 g and a sample was analyzed to be lead carbonate (cerussite, $PbCO_3$). Some of this solid was then washed in hot water and analyzed to be unchanged lead carbonate (it is reported, however, that lead carbonate is transformed in hot water to the basic carbonate in the Encyclopedia of Chemical Technology, lead compounds (salts)).

Example 8

About 12 g of the insoluble material from the lead leach was added to a small flask containing 50 ml of distilled water and 20 g of reagent potassium hydroxide. The solution was stirred and heated on a hot plate for 20 min. For testing purposes, the solution was diluted and filtered. The remaining solids weighed 4.9 g (41% of original mass). By DCP, the solution was high in potassium and tin with traces of lead, zinc, aluminum, cadmium and copper. If the 59% represented tin as $SnO_2$ only, 6.2 g of tin were present.

Example 9

The solids from the hydroxide (tin) leach were added to a flask containing enough concentrated sulfuric acid to cover the solids. It was heated on the hot plate for 20 min. The color changed to a dark brown as the reaction proceeded. Once the mixture had cooled, distilled water was added (carefully), the solution was filtered, and the solid left was dried and weighed. This leach removed 65% of the weight of the material, and was tested via DCP to contain a large majority of zinc and tin with traces of iron, aluminum and copper. The solid was dissolved to a small degree in a mixture of perchloric/nitric/hydrochloric acids. It contained mostly Sn, Cu, Fe, Al, and Pb with traces of Ni, Zn, Mn, Cd, Ca, Mg, K, Na, Ba, and V. The tin and other components were precipitated by neutralization with zinc oxide, and the zinc remained in solution, as the sulfate.

The above description sets forth the best mode of the invention as known to the inventor at this time, and the above examples are for illustrative purposes only, as it is obvious that one skilled in the art may make modifications to this process without departing from the spirit and scope of the invention and its equivalents as set forth in the appended claims.

What is claimed is:

1. A method for the reclamation of crystallized zinc compounds, and copper and lead metals from dust containing said metals comprising the steps of:

a) treating said dust with a sulfur-based leachant until at least a substantial portion of the zinc is dissolved;

b) separating at least a substantial portion of any undissolved solids in, and insoluble compounds formed while treating said dust with said leachant, from the solution;

c) adding a zinc compound to said solution to increase the pH of the solution to a sufficient level to cause the formation of precipitates of basic sulfate salts and separating said basic sulfate salts from the solution;

d) adding zinc metal to the solution to achieve a first cementation step whereby lead and copper ions contained within the solution are displaced by said zinc metal and precipitate out of the solution as lead and copper metallic solids and separating said lead and copper metallic solids from the solution; and e) forming crystallized zinc compounds from the zinc component in the solution and separating the crystallized zinc compounds from the solution.

2. The method of claim 1, further comprising recycling the solution remaining after step e) to be used as the solution in step a).

3. The method of claim 1, wherein an acid is added to the solution in Step d) to make the solution slightly acidic prior to adding the zinc containing dust.

4. The method of claim 1, wherein the crystallized zinc compounds of step e) are precipitated by lowering the temperature of the solution.

5. The method of claim 1, wherein said leachant solution is selected from the group consisting of sulfuric acid and ammonium bisulfate solutions.

6. The method of claim 1, wherein said insoluble compounds comprise lead.

7. The method of claim 1, wherein said zinc compound is selected from the group consisting of zinc oxide and zinc hydroxide.

8. The method of claim 5, wherein said leachant solution is a sulfuric acid solution.

9. The method of claim 5, wherein said leachant solution is an ammonium bisulfate solution.

10. The method of claim 7, wherein said zinc compound is zinc oxide.

11. The method of claim 7, wherein said zinc compound is zinc hydroxide.

12. The method of claim 6, wherein lead compounds are recovered from said lead solids by a method comprising the steps of:

f) treating said insoluble compounds with an ammonium chloride solution at an elevated temperature to form a solution comprising lead chloride.

13. The method of claim 12, further comprising separating at least a substantial portion of any undissloved solids in and insoluble compounds formed from the solution and lowering the temperature of said solution thereby precipitating the lead component as lead chloride crystals.

14. The method of claim 13, further comprising adding calcium chloride to the solution remaining after the precipitation of the lead chloride crystals, whereby calcium sulfate is precipitated from the solution.

15. The method of claim 14, further comprising recycling the solution remaining after the calcium sulfate has been precipitated to be used as the solution in step f).

16. The method of claim 1, wherein said basic sulfate salts are converted into oxides by roasting said basic sulfate salts at a temperature of at least approximately 400° C.

17. The method of claim 16, wherein said oxides are returned to said dust for further treatment.

18. The method of claim 1, wherein said copper metallic solids further comprises cadmium compounds and zinc compounds and said copper metallic solids are treated with sulfuric acid to remove at least a portion of said cadmium compounds and said zinc compound to produce solids with a high copper content.

19. The method of claim 1, wherein said dust further comprises cadmium which dissolves into the solution in step a), the cadmium being removed from the dust by adding zinc metal to the solution wherein any cadmium ions contained in the solution are displaced by said zinc metal and precipitate out of the solution as cadmium metallic solids and separating said cadmium metallic solids from the solution.

20. The method of claim 19, further comprising repeating step d) to achieve a second cementation step solution wherein any cadmium ions remaining in the solution are displaced by said zinc metal and precipitate out of the solution as cadmium metallic solids and separating said cadmium metallic solids from the solution.

21. The method of claim 20, wherein cadmium metal is recovered from said cadmium metallic solids by treating said cadmium metallic solids with a sulfuric acid solution in the presence of a zinc metal article, said cadmium metal forming on said zinc metal article as a cadmium sponge.

22. The method of claim 21, wherein any zinc sulfate remaining in the solution after the formation of the cadmium sponge is recycled to step a).

23. The method of claim 8, wherein said dust further comprises tin, said insoluble compounds further comprise tin compounds, and tin is recovered from said insoluble compounds by a method comprising the steps of:
   h) treating said insoluble compounds with a hydroxide at an elevated temperature to form a solution comprising dissolved tin.

24. The method of claim 23, wherein said hydroxide is selected from the group consisting of sodium hydroxide and potassium hydroxide.

25. The method of claim 23, wherein said insoluble compounds further comprise lead and tin and said solution further comprises dissolved lead and tin, and at least a portion of said dissolved lead and tin is removed from said solution by the addition of a soluble sulfhydrate salt.

26. The method of claim 25, wherein said soluble sulfhydrate salt is sodium sulfhydrate.

27. The method of claim 25, wherein said insoluble compounds further comprise insoluble zinc compounds and insoluble tin compounds and at least a portion of said insoluble zinc compounds and said insoluble tin compounds are recovered from said insoluble compounds by a method comprising the steps of:
   i) treating said insoluble compounds with sulfuric acid until at least a portion of said insoluble zinc compounds and said insoluble tin compounds are dissolved;
   j) adding a zinc compound to said sulfuric acid containing solution to increase the pH of said solution to a sufficient level to cause the formation of a basic sulfate precipitate high in tin; and
   k) separating said basic sulfate precipitate high in tin from said solution.

28. The method of claim 27, wherein said basic sulfate precipitate high in tin is roasted after being separated from said solution.

29. The method of claim 27, wherein said solution is recycled to step a).

30. The method of claim 1 in which the reclamation method is a continuous method.

31. A method for the reclamation of zinc compounds, copper, cadmium and, lead and lead compounds from dust containing said metals, comprising the steps of:
   a) treating said dust with a leachant solution selected from the group consisting of sulfuric acid and ammonium bisulfate solutions until at least a substantial portion of the zinc is dissolved and any lead in said dust will not go into solution and separating said lead from said solution;
   b) adding a compound selected from the group consisting of zinc oxide and zinc hydroxide to said solution to increase the pH of said solution to a sufficient level to cause the formation of precipitates of sulfate salts and separating said salts from said solution;
   c) adding a zinc metallic dust to said solution to achieve a first cementation step causing the formation of copper solids and separating at least a portion of said copper solids from said solution; and
   d) adding a zinc metallic dust to said solution to achieve a second cementation step causing the formation of cadmium solids and separating at least a portion of said cadmium solids from said solution.

32. The method of claim 31, wherein zinc sulfate is recrystallized from said solution and the remaining solution is recycled and added to said leachant solution.

33. The method of claim 31, wherein said lead is treated with an ammonium chloride at elevated temperature to cause the formation of lead chloride, separating said lead chloride from said solution, and recycling said solution to treat further quantities of said lead.

34. A method for the reclamation of zinc compounds and other metals from dust containing zinc and other metals, comprising the steps of:
   a) treating said dust with a solution selected from the group consisting of sulfuric acid and ammonium bisulfate solutions until at least a substantial portion of the zinc is dissolved whereby any lead solids in said dust will not go into solution;
   b) separating said lead solids from said solution;
   c) adding a compound selected from the group consisting of zinc oxide and zinc hydroxide to said solution to increase the pH of said solution to a sufficient level to cause the formation of precipitates of basic sulfates of at least a portion of said other metals;
   d) separating said precipitates from said solution;
   e) adding a zinc containing dust to said solution to achieve a first cementation step causing the formation of copper solids and separating at least a portion of said copper solids from said solution; and
   f) removing lead from said lead solids by treating said lead solids with ammonium chloride to produce lead chloride.

35. The method of claim 34, further comprising the step of:
   g) treating said copper solids with sulfuric acid to produce solids with a high copper content.

36. A method for the reclamation of lead, copper and cadmium solid from dust containing zinc, lead, copper and cadmium comprising the steps of:

a) treating said dust with a solution selected from the group consisting of sulfuric acid and ammonium bisulfate solutions until at least a portion of the zinc, copper and cadmium is dissolved whereby any lead solids in said dust will not go into solution;
b) separating said lead solids from said solution;
c) adding to said solution a compound selected from the group consisting of zinc oxide and zinc hydroxide to increase the pH of said solution to a sufficient level to cause the formation of basic sulfate precipitates of zinc and copper and separating said precipitates from said solution;
d) adding a zinc containing dust to said solution to achieve a first cementation step to cause the formation of copper and cadmium solids and separating the copper solids from said solution;
e) adding a zinc containing dust to said solution to achieve a second cementation step to cause the formation of cadmium solids and separating said cadmium solids from the solution;
lowering the temperature of said solution to crystallize the zinc in solution;
g) removing the lead from said lead solids by treating said lead solids with ammonium chloride to produce lead chloride and tin solids, treating the remaining ammonium chloride solution with calcium chloride to produce calcium sulfate, removing said calcium sulfate from said ammonium chloride solution, and recycling said ammonium chloride solution to be used in treating additional lead solids;
h) treating said copper solids with sulfuric acid to produce solids with high copper content; and
i) treating said cadmium solids with sulfuric acid to produce cadmium solids.

* * * * *